United States Patent Office 3,658,924
Patented Apr. 25, 1972

3,658,924
FLUORINATED ALKYL ALLENES
Robert Neville Haszeldine, Disley, England; Ronald Eric Banks, Torkington, England; and David Robin Taylor, Bramhall, England (all c/o Pennwalt Corporation, 900 1st Ave., King of Prussia, Pa. 19406)
No Drawing. Filed Oct. 3, 1969, Ser. No. 863,717
Claims priority, application Great Britain, Oct. 23, 1968, 50,295/68
Int. Cl. C07c 21/18
U.S. Cl. 260—653.3     4 Claims

ABSTRACT OF THE DISCLOSURE 1,1-difluoro-3-polyhalogenoalkylallenes of the formula

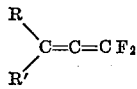

where R is fluorinated or fluorochlorinated alkyl and R' is fluorine, chlorine or fluorinated or fluorochlorinated alkyl, are useful for the preparation of cross-linkable polymers having oil and water repellent properties.

---

This invention relates to the preparation of fluorinated unsaturated organic compounds, and more particularly concerns a new class of fluorinated alkyl allenes.

The compounds of this invention are 1,1-difluoro-3-polyhalogenoalkylallenes of the formula:

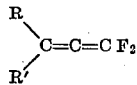

where R represents a fluorinated or fluorochlorinated alkyl or cycloalkyl group having from 1 to about 20 carbon atoms. Preferably, R and R' (when organic) are polyfluorinated, i.e., containing at least two fluorine atoms, and containing not more than one chlorine atom, and more preferably a perfluorinated or perfluorochlorinated alkyl or cycloalkyl group. Most preferred compounds are those where R is perfluoro-($C_1$–$C_4$)-alkyl and R' is fluorine, chlorine or perfluoro ($C_1$–$C_4$) alkyl.

The monomeric compounds of this invention are prepared by dehydrohalogenation of organic iodides of the formula:

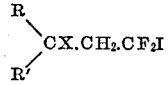

where R and R' are as defined above and X is chlorine or fluorine. The iodide starting material is readily obtained by conventional, well known procedures, for example, by telomerisation of the telogen iodide

with 1,1-difluoroethylene:

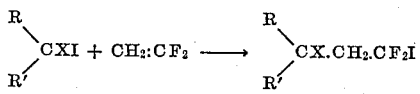

The dehydrohalogenation of the foregoing iodide may be carried out in one or two steps. In the preferred one step procedure the starting iodide is subjected to vigorous dehydrohalogenation by heating in the presence of concentrated alkali metal hydroxide, preferably sodium or potassium hydroxide or a mixture of such hydroxides. The dehydrohalogenation may be carried out by bubbling the starting iodide through the heated alkali metal hydroxide, which may be a concentrated aqueous solution e.g. 80% or more, or, more preferably a molten hydroxide or hydroxide mixture.

In the less preferred two step procedure the starting iodide is first subjected to mild dehydroiodination, for example, by warming gently in dilute, e.g. 10%, aqueous alkali metal hydroxide, or by warming gently with a powdered alkali metal hydroxide or mixture. The intermediate monoene thus produced, being of the formula:

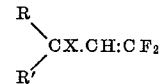

is then subjected to vigorous dehydrohalogenation by the procedure already described in connection with the preferred one step synthesis.

The preparation of the compounds of the invention is graphically illustrated by the following reaction schemes.

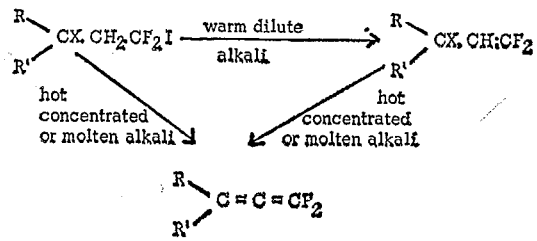

The invention is clarified by the following illustrative examples:

EXAMPLE 1.—PERFLURORPENTA-1,2-DIENE

Preparation of starting compound: 2H, 2H-3-chloro-octafluoro-1-iodopentane

A mixture of trifluoroiodomethane (96.1 g., 0.49 mole) and chlorotrifluoroethylene (11.6 g., 0.10 mole) was irradiated for 4 days in a silica tube (1.2 l.) placed 12 cm. from a 500 watt "Hanovia" Lamp to give a 96:4 mixture of 1-chloro- and 2-chloro-hexafluoro-1-iodopropane (21.5 g., 68.9 mmoles, 72% yield based on olefin consumed). The mixture of iodopropanes (1-chlorohexafluoro-1-iodopropane: 17.2 g., 55 mmoles) was reacted with 1,1-difluoroethylene (3.5 g., 55.3 mmoles), in a rocking autocalves (16 ml.) at 145° C. for 20 hours to give 2H, 2H-3-chloro-octafluoro-1-iodopentane (16.9 g., 44.8 mmoles, 88% yield).

Dehydrohalogenation of 2H, 2H-3-chloro-octauoro-1-iodopentane

A cylindrical copper reaction vessel fitted with a sealed cover and an inlet pipe extending through said cover to a point 1½ inches from the bottom of the vessel and an outlet pipe extending through the cover by not more than ½ inch was charged with about 300 g. of a 60:40 mixture of potassium and sodium hydroxides. The vessel was evacuated and heated to 180° C. for ½ hour under a nitrogen purge to remove water. At the end of that period and with the temperature maintained at 180° C. and a pressure of $10^{-3}$ mm. Hg, a stream of 2H, 2H-3-chloro-octafluoro-1-iodopentane was introduced through the inlet below the surface of the alkali. A vigorous exothermic reaction ensued eliminating any need for agitation of the reaction mixture. Volatile products were swept from the reaction vessel by a stream of dry nitrogen and condensed in traps cooled to −196° C. The various volatile fractions were separated by trap-to-trap fractional condensation in vacuo followed by gas-liquid chromatography.

The reaction showed a 100% conversion of the starting iodopentane into the following products:

| | Yield, mole percent based on starting material consumed |
|---|---|
| $C_2F_5.CF:C:CF_2$ | 68 |
| $C_2F_5CCl:C:CF_2$ | 4 |
| $C_2F_5.CFCl.CH:CF_2$ | 8 |
| $C_2F_5H$ | 4 |

Product perfluoropenta-1,2-diene was recovered as a colourless liquid (Analysis: Found C, 28.0%; M, 212, 213 by mass spectrometry and Regnaults method respectively. $C_5F_8$ requires C, 28.3%; M, 212), $\lambda_{max.}$ (vapour) 237–239 mµ (ϵ, 130), B.P. 22.9° C. (isoteniscope). Infrared spectrographic analysis of the vapour shows bands at 2.80 m., 3.92 s., 4.05 m., 4.17 m., 4.41 m., 4.60 m., 4.70 m., 4.88 vs. (asymmetric C:C:C. str.) 5.20 m., 5.35 m., 5.72 m., 6.65 vs., 7.47 vs., 7.85 vs., 8.12 vs., 8.40 vs., 8.85 vs., 9.55 vs., 9.95 s., 10.45 m., 11.05 vs., 11.30 vs., 11.86 s., 12.15 m., and 13.31 s.µ.

Perfluoropenta-1,2-diene was stored at −78° C. without dimerising. At higher temperatures e.g. 18–22° C. dimerisation occurs readily to give a colourless liquid (M, 424. Calc. for $C_{10}F_{16}$, M 424 B.P. 138–141°/758 mm. Gas liquid chromatography of the liquid dimer gave four fractions:

(I): perfluoro (3,4-diethyl-1,2-dimethylcyclobutane, 22%
(II): perfluoro (3-ethyl-2-methylene-3-propylidene cyclobutane), 63%
(III): an unidentified isomer $C_{10}F_{16}$, 13%
(IV): three unidentified compounds, 2%.

Analysis of a 80:20 mixture of I and II gave: Found C, 28.2% calc. for $C_{10}F_{16}X$:C, 28.3%, $N_D^{20}$ 1.333, $\lambda_{max.}$ (cap. film) at 5.60 s. (C:C str.), 5.77 vs., (C:C str.), 5.85 sh., 7.42 s., 7.48 sh., 7.55 s., 7.73 s., 8.05 sh., 8.17 s., 8.48 s., 8.63 sh., 8.84 m., 8.95 m., 9.08 m., 9.21 m., 9.91 m., 10.16 w., 10.73 m., 10.83 m., 11.30 w., 11.70 w., 12.02 m., 12.40 m., 13.11 w., 13.45 m., 13.70 w., 13.88 s. and 14.20 m.µ.

EXAMPLE II

A round-bottomed "Pyrex" glass flask was fitted with a thermometer pocket, a dropping funnel with an extended drip cone reaching to within ¼ inch of the bottom of the flask, and a reflux condenser vented via a $P_2O_5$ drying tube to a series of liquid traps cooled to −196° C.

The flask was charged with an 80% potassium hydroxide solution and 2H, 2H-3-chloro-octafluoro-1-iodopentane was introduced slowly below the surface of the hydroxide solution maintained at 160°/100 mm. Hg in a stream of nitrogen.

Product recovery was carried out as in Example 1 and analysis showed a conversion of 100% into:

| | Yield, mole percent based on starting material consumed |
|---|---|
| $C_2F_5CF:C:CF_2$ | 38 |
| $C_2F_5CFCl.CH:CF_2$ | 46 |
| $CF_3C:CH$ | 4 |
| $C_2F_5H$ | 8 |
| $C_3$ olefins | 7 |

EXAMPLE III

Preparation of 2H-3-chloro-octafluoropent-1-ene 2H, 2H-3-chloro-octafluoro-1-iodopentane (2.2 g., 5.9 mmoles) prepared as in Example I was added dropwise to 50 ml. of a 10% aqueous potassium hydroxide at 70° C./300 mm. Hg with stirring. 2H-3-chloro-octafluoropent-1-ene (1.26 g., 5.1 mmoles, 87% yield) was recovered as a colourless liquid B.P. 57.6° C.

In an alternative procedure 2H, 2H-3-chloro-octafluoro-iodopentane (2.0 g.) were warmed gently in vacuo with powdered anhydrous potassium hydroxide. 2H-3-chloro-octafluoropent-1-ene was recovered from the volatile reaction products in 93% yield together with perfluoropenta-1,2-diene in 5% yield.

Dehydrohalogenation of 2H-3-chloro-octafluoropent-1-ene 2H-3-chloro-octafluoropent-1-ene prepared as above was subjected to vigorous dehydrohalogenation by the procedure described in Example 1 but with the molten hydroxide mixture maintained at 190° C. and $10^{-3}$ mm. Hg.

Analysis of the product showed a 53% conversion of 2H-3-chloro-octafluoropent-1-ene into:

| | Yield, mole percent based on material consumed |
|---|---|
| $C_2F_5CF:C:CF_2$ | 58 |
| $C_2F_5CCl:C:CF_2$ | 5 |

EXAMPLE IV 2H-3-chloro-octafluoropent-1-ene prepared as in Example III was dehydrohalogenated by the procedure of Example II.

Analysis of the product showed a 50% conversion of the starting material into:

| | Yield, mole percent based on material consumed |
|---|---|
| $C_2F_5 \cdot CF:C:CF_2$ | 40 |
| $CF_3C:CH$ | 4 |
| $C_2F_5H$ | 7 |
| $C_3$ olefins | 8 |

EXAMPLE V

Preparation of 2H, 2H-nonafluoro-1-iodopentane

Heptafluoro-1-iodopropane (7.3 g., 24.7 mmoles) and 1,1-difluoroethylene (0.96 g., 15.0 mmoles) irradiated for 24 hours in a silica tube (60 ml.) placed 8 cm. from a 500 watt "Hanovia" Lamp, gave heptafluoro-1-iodopropane (71%), 1,1-difluoroethylene (52%), 2H, 2H-nonafluoro-1-iodopentane (1.51 g., 4.2 mmoles, 58%), B.P. 103.9° (isoteniscope), $n_D^{20}$ 1.350 identified spectroscopically (i.r.), together with unidentified higher boiling material (1.12 g.).

Dehydrohalogenation of 2H, 2H-nonafluoro-1-iodopentane 2H, 2H-nonafluoro-1-iodopentane prepared as above was subjected to vigorous dehydrohalogenation by the procedure of Example I but using potassium hydroxide in place of the potassium hydroxide-sodium hydroxide mixture and a temperature of 365° C.

Product analysis showed a 100% conversion of the starting material into:

| | Yield, mole percent based on material consumed |
|---|---|
| $C_2F_5CF:C:CF_2$ | 23 |
| $C_2F_5CF_2CH:CF_2$ | 28 |

EXAMPLE VI

Preparation of perfluoro-(3-methylbuta-1,2-diene)

2H, 2H - hexafluoro - 1 - iodo-3-trifluoromethylbutane (9.60 g.), prepared by heating an equimolar mixture of heptafluoro-2-iodopropane and vinylidene fluoride at 190° C. was bubbled at ca. $10^{-2}$ mm. Hg pressure through a molten mixture of sodium and potassium hydroxides (weight ratio 4:6) heated to 200° C. The product collected at −196° C., was dried over $P_2O_5$ and separated by a combination of fractional distillation and gas-liquid chromatography techniques to provide perfluoro-(3-methylbuta-1,2-diene) (0.95 g.) (Found: C, 28.6%, M, 212. $C_5F_8$ requires C, 28.3%; M, 212), $\lambda_{max.}$ (vapour) 4.87µ (C:C:C str.), B.P. 19.7° (isoteniscope), and 2H-hexafluoro-3-trifluoromethylbut-1-ene (1.67 g.). Both products had correct [19]F n.m.r. spectra.

The compounds of this invention are utilized in preparing polymers containing repeating units of the formula:

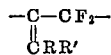

These may be homopolymers, copolymers of two or more different compounds of the invention, or copolymers with other ethylenically unsaturated compounds, especially fluorinated compounds such as tetrafluoroethylene, hexafluoropropene and vinylidene fluoride.

The monomeric compounds of the invention are homopolymerised or copolymerised with other ethylenically unsaturated comonomers, particularly fluorinated compounds, by known free radical polymerisation techniques using initiators such as organic peroxides, e.g., benzoyl peroxide or t-butyl peroxide, or inorganic peroxy compounds, e.g., potassium persulphate. Polymerisation may be in bulk or may be carried out in solution or suspension.

A particular feature of the polymers derived from the fluorinated allenes embodied herein is their ability to undergo cross-linking, either inter se, for example, by milling or heating in the presence of a free radical initiator, such as benzoyl peroxide or other peroxide, or by reaction of the =CRR' groups in the polymer with a difunctional reagent capable of undergoing addition to an ethylenic double bond having halogen or halogenoalkyl or cycloalkyl substituents on the vinylic carbon atom. Suitable difunctional reagents include diamines, diols and alkoxides derived from them, and dithiols and anions derived therefrom. Cross-linking may, of course, be carried out on homopolymers and copolymers of two or more of the monomeric compounds of the invention. More especially, the monomeric compounds are useful for introducing unsaturated side chains into other fluorinated polymers, particularly polymers of tetrafluoroethylene, vinylidene fluoride and hexafluoropropene. For this purpose the monomeric compounds of the invention will generally be copolymerised with the comonomer or comonomers in amounts ranging from 1–30%, preferably 1–10% by weight.

The polymers thus produced are white, solid materials. With increasing degrees of cross-linking the polymers become progressively harder and tougher and show greater insolubility and resistance to oxidative and hydrolytic attack. Copolymers with vinylidene fluoride are less soluble than polyvinylidene fluoride itself, while the copolymers with tetrafluoroethylene are less crystalline than polytetrafluoroethylene leading to a greater ease in fabrication.

The polymers are useful coating agents for wire and other metal surfaces. The polymers also have marked oil and water-repellent properties and both the homopolymers and copolymers with other fluoro-olefins are useful for imparting oil and water repellent properties to textile fabrics and leather. Especially suitable in this respect are homopolymers and copolymers of monomeric compounds of the formula specified where one or both of R and R' is a perfluoroalkyl group, especially a straight chain $C_3$–$C_9$ perfluoroalkyl group. The polymers may be applied as solutions or emulsions in suitable liquid media. Following deposition on the substrate further interaction of the pendant =CRR' groups in the polymer with reactive groups such as —OH and —$NH_2$ in the substrate may take place, resulting in cross-linked coatings of good chemical and mechanical stability.

We claim:
1. A compound having the structure $RCF=CF=CF_2$ where R is perfluoroalkyl of 1 to 4 carbon atoms.
2. A compound according to claim 1 wherein R is perfluoroethyl.
3. A compound having the structure $RCCl=CF=CF_2$ where R is perfluoroalkyl of 1 to 4 carbon atoms.
4. A 1,1-difluoro-3-polyhalogenoalkylallene having the structure

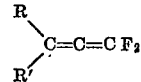

where R is $C_3$–$C_9$ perfluoroalkyl and R' is $C_3$–$C_9$ perfluoroalkyl.

References Cited
UNITED STATES PATENTS

| | | | |
|---|---|---|---|
| 3,372,205 | 3/1968 | Dear et al. | 260—653.3 |
| 3,513,206 | 5/1970 | Wall et al. | 260—653.5 |
| 3,337,645 | 8/1967 | Hamilton | 260—653.3 |

DANIEL D. HORWITZ, Primary Examiner

U.S. Cl. X.R.

106—2; 117—128, 138.5, 142; 252—8.57, 8.6; 260—92.1, 653.1 T, 653.5, 884